May 12, 1936.  J. H. DAVIS  2,040,600
METHOD OF AND APPARATUS FOR TREATING GRAIN FOR
EXTERMINATION OF INSECT LIFE THEREIN
Filed April 29, 1932   4 Sheets-Sheet 1
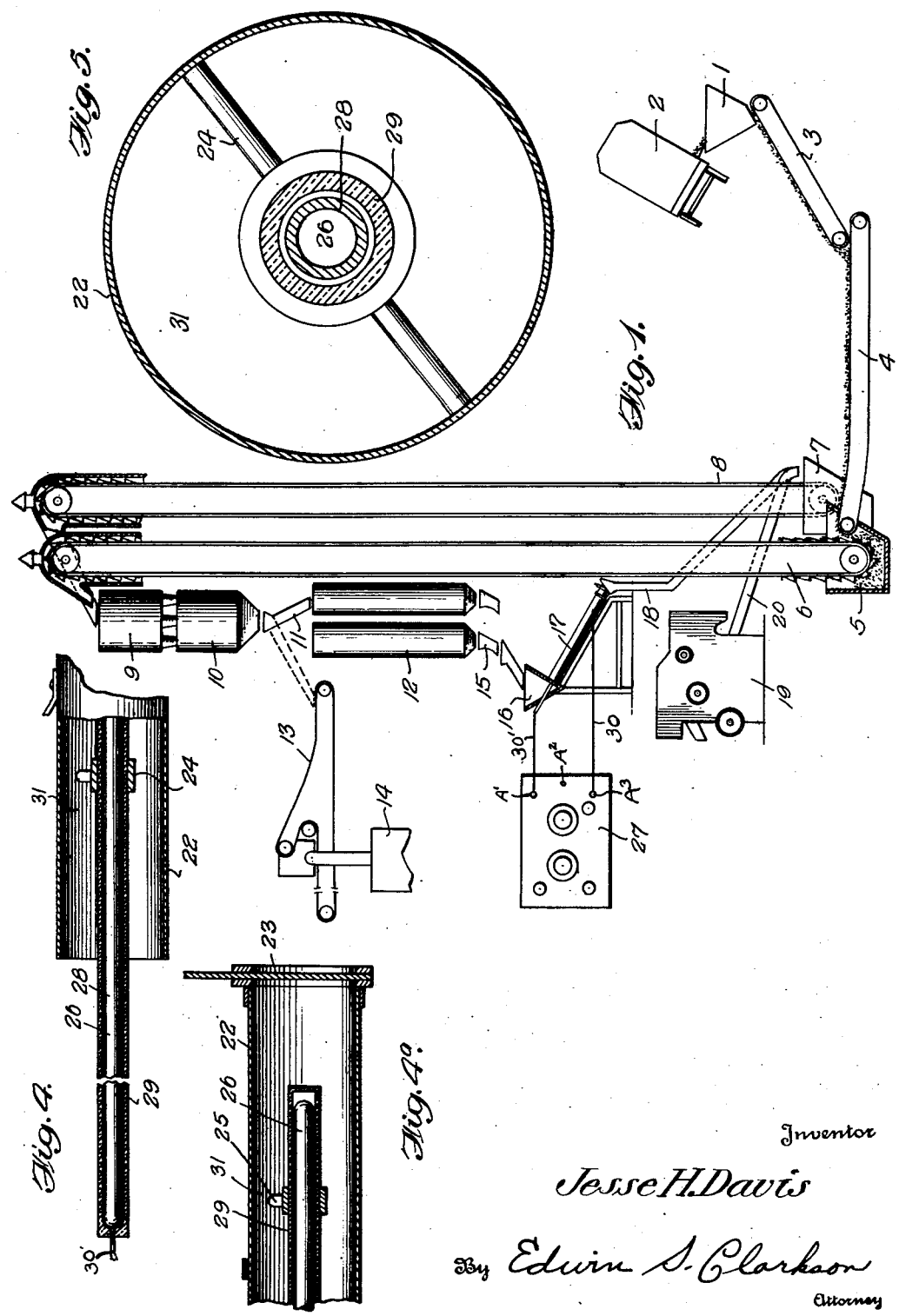
Inventor
Jesse H. Davis
By Edwin S. Clarkson
Attorney

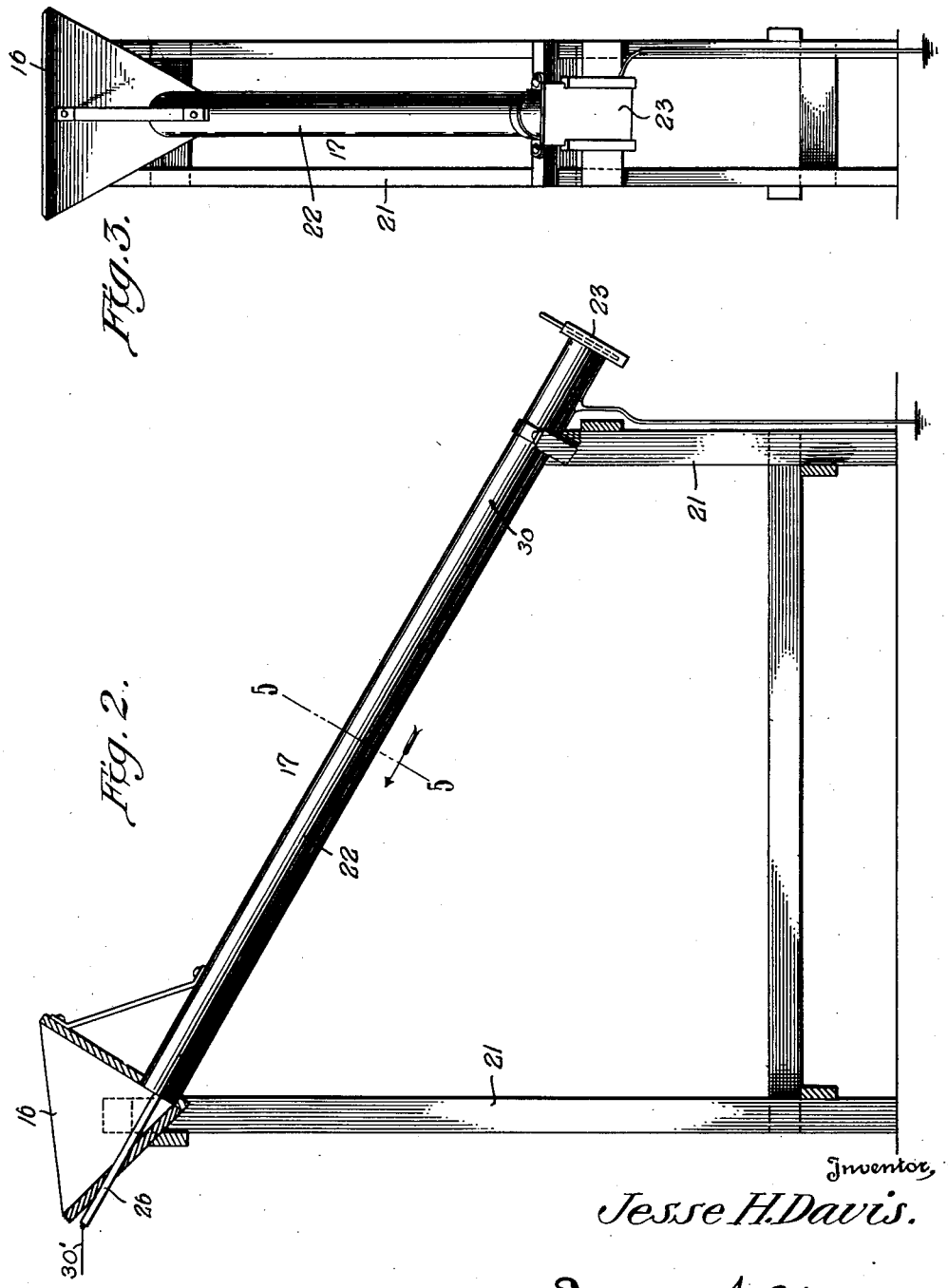

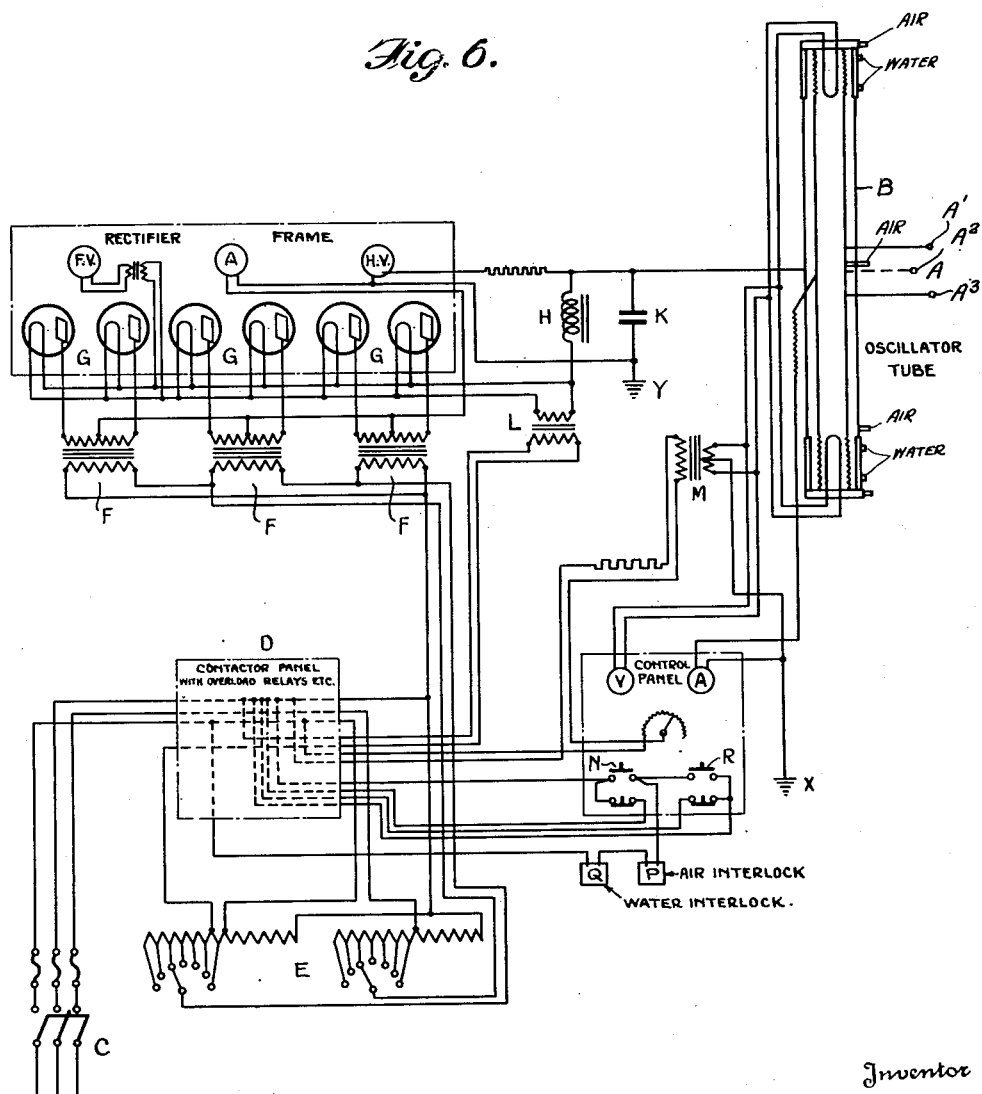

May 12, 1936.  J. H. DAVIS  2,040,600
METHOD OF AND APPARATUS FOR TREATING GRAIN FOR
EXTERMINATION OF INSECT LIFE THEREIN
Filed April 29, 1932   4 Sheets-Sheet 4
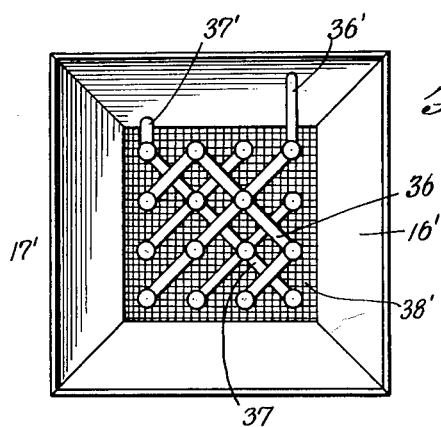
Fig. 8.
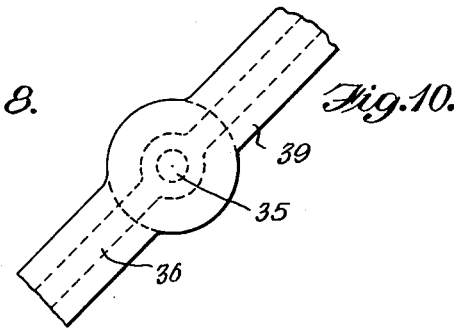
Fig. 10.
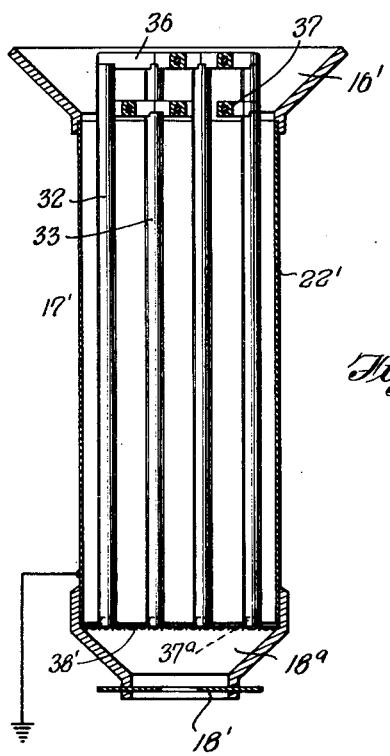
Fig. 7.
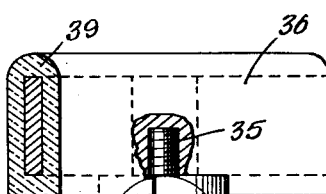
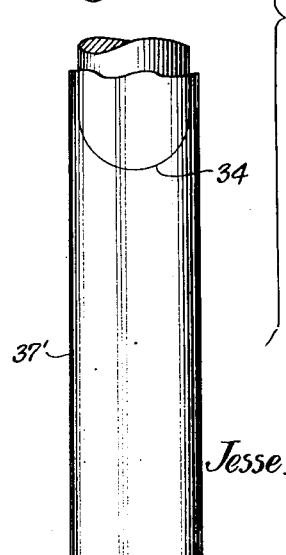
Fig. 9.
Fig. 11.
Inventor
Jesse H. Davis Patented May 12, 1936

2,040,600

UNITED STATES PATENT OFFICE 2,040,600

METHOD OF AND APPARATUS FOR TREATING GRAIN FOR EXTERMINATION OF INSECT LIFE THEREIN

Jesse H. Davis, Baltimore, Md.

Application April 29, 1932, Serial No. 608,312

40 Claims. (Cl. 175—311)

This invention relates to a method of and apparatus for treating grain in bulk and in desired quantities for the purpose of exterminating grain weevil, moths, and other like injurious insects, and their larvae and pupa, which prey upon wheat and other stored grain. More particularly the invention relates to an apparatus for use in treating grain while in process of being loaded into elevators or other storage houses from railway cars, motor vehicles or other carrier vehicles, marine vessels, etc., or while being unloaded from an elevator or like storage place into vehicles of the character described for delivery transportation, or while being transferred from one bin or receptacle to another or from one point to another of an elevator or other storage house.

Great losses are caused, in storage of wheat and other grain in elevators, grainaries and other storage houses, due to the partial or complete destruction or quality impairment of the grain stored therein as a result of the depredations of the weevil, grain moth and similar insects, as well as to the methods heretofore employed in attempts to curb or prevent such depredations.

When the grain is received at an elevator for storage, tests are made for its classification under the United States Grain Act. Samples of the grain are then taken according to regulations prescribed by the Department of Agriculture, and the classification is made according to what is shown by the samples. The grain is classified or graded in from one to six grades, dependent upon quality and condition. If it is found to be weevily or otherwise infested with insect life it it classified as it ordinarily would be, except that it is noted as being weevily. The proportion of weevily grain or other insect-infested grain contained in bulk grain received from different portions of the United States and Canada varies in percentage. Grain received at an elevator or storage house from marine vessels, wagons or trucks is sometimes, irrespective of condition, delivered to the elevator without being subjected to insecticide treatment. In other cases, whenever it has been found that a load of grain arriving at an elevator for storage is weevily it has been the practice to treat it chemically then and there before it is unloaded from the car. This treatment usually consists in subjecting the grain to the action of any one or more of a number of fumigants or gases commonly used for killing insects in grain, but these methods have not been found wholly effective or reliable and have generally proved to be objectionable on account of fire hazard, excessive cost, toxicity to man, or deleterious effect on the grain, and operators have found it necessary to resort to handling the grain in order to preserve it from destruction. Whatever the percentage of insect life which may exist in the grain at the time of storage may be, it is highly desirable to treat the grain at this time for the destruction of the insect life therein, as this percentage is greatly increased after a period of storage, owing to the development of natural heat in the grain and the resultant great multiplication of insect life due to this and other factors therein. In all modern elevators very elaborate means are accordingly provided for automatically indicating the extent of the heating of the grain in the storage compartments or bins. When this heating of the grain has reached certain proportions, it is necessary to run grain from one elevator bin to another for cooling and airing in order to maintain the grain at a sufficiently low temperature to reduce insect activity. Such operations of re-handling the grain for cooling and airing must be repeated at intervals at a considerable cost of time and labor. These re-handling operations cause dockage losses and drying of the grain, and it has been figured in the operation of elevators at Locust Point, Maryland, that a loss in weight of .46 of 1% of the amount of grain is sustained at each handling, so that, when the grain is handled many times as often required, the loss in weight alone from such cooling and airing actions involves a considerable percentage of the total value of the grain. In making an estimate of losses occurring as a result of weight depreciation alone, due to cooling and airing methods at the Locust Point grain elevators, based upon treatment of about two million bushels of grain which has been stored for some time, it was found that this grain had been handled for cooling and airing as many as thirteen times, and that the loss in weight due to such handling, dockage and other causes, such as the drying of the grain by contact with air in its travel over belts and through spouts, aggregated approximately 6½% of the original weight of the grain, so that even at the low valuation of fifty cents per bushel, the loss due to decrease in weight alone runs into very large figures, which would be multiplied many times in the handling of the grain for lengthy periods. When to this item of loss is added the labor and operation of the machinery to re-handle the grain, and the losses due to depredation of the insects with which it is infested, it can be seen that the value of grains stored for any length of time is materially decreased as a result of the dual effect of the depredations of insects and the measures taken to reduce such depredations and which are necessary in order to prevent total loss of the grain. As no method of treatment heretofore used, so far as I am aware, has been effective in destroying all insects contained in grain which is in storage, or reducing insect life in the grain to a degree where it is not a source of great trouble and expense, the ineffective treatment operations heretofore employed must be carried on, at great expense, in order to keep the losses as low as possible.

One object of my invention is to provide a method and apparatus operable in the line of transit of grain and employing the effect of electrical high frequency oscillations as a destructive agent whereby grain may be rapidly, easily, economically and efficiently treated to destroy with certainty all insect life therein.

A further object of my invention is to provide an apparatus of the character described whereby grain in process of being unloaded from a carrier vehicle into an elevator or grainery for storage may, during the unloading operation or while it is in transit, be treated for the destruction of insect life therein at a time desirable for the purpose in order to prevent the increase of insect life commonly occurring after the grain is stored.

A still further object of my invention is to provide an apparatus of the character described whereby the grain transferred from carrier vehicles to the bins of an elevator or grainery will be wholly relieved of insect life or relieved to such an extent as to avoid or reduce to a minimum the frequent cooling and airing steps heretofore required, so as to not only prevent the losses due to depredations of the insects, but also the losses in weight due to cooling and airing treatments.

A still further object of my invention is to provide an apparatus of the character described whereby the treated grain in course of loading transit may be subjected or not to cleaning treatment.

A still further object of my invention is to provide an insect exterminating apparatus which will be automatic in action and whereby a very large amount of grain may be treated within any given period of time.

A still further object of my invention is to provide an apparatus of the character and for the purpose described which may be used without fire hazard or liability of tainting or otherwise injuring the grain treated.

A still further object of my invention is to provide an apparatus of the character and for the purpose described which is based upon the method of employing high frequency electrical oscillations for the destruction of insect life which I have discovered and means for the use of which I have invented, as set forth in my prior application filed December 10, 1931, Serial No. 580,170.

In an application executed of even date herewith I have disclosed a similar method of and apparatus for exterminating insects in grain in a grain feed system, the exterminating apparatus employed therein being of "tank" or "box" type and employing platen electrodes; the present application differing therefrom in employing a specifically different method of treatment and an exterminating apparatus of "tube" type or one presenting a curved or circular working field or electrodes of such form.

In the accompanying drawings showing one form of apparatus for carrying the invention into practical effect,—

Fig. 1 is a diagrammatic side elevation of a grain feed apparatus, as designed for use in an elevator or grainery, embodying my improved exterminator.

Fig. 2 is a view in side elevation, partly in section, on an enlarged scale, of the exterminator.

Fig. 3 is a view in front elevation thereof.

Figs. 4 and 4a are longitudinal sections through the inlet and delivery ends of the exterminator.

Fig. 5 is a transverse section on line 5—5 of Fig. 2 on an enlarged scale.

Fig. 6 is a diagrammatic view of the exterminator oscillation generator circuit.

Fig. 7 is a vertical longitudinal section through another form of exterminator.

Fig. 8 is a top plan view of the same.

Fig. 9 is a view, partly in elevation and partly in section, of one of the electrodes and a portion of a bus bar on an enlarged scale.

Fig. 10 is a plan view of a portion of a bus bar.

Fig. 11 is a section through a part of the screen support and one of the steady blocks separated from but disposed in proper relation to the electrode tube shown in Fig. 9.

In the structural organization disclosed, for purposes of exemplification, a receiver 1 is shown arranged at a dumping point for the reception of the grain discharging from the railway car or other carrier vehicle 2, and from which the grain is transferred by means of belt or other conveyors 3 and 4 to the boot 5 of the receiving leg 6 of a hoisting device or elevator, also shown as including a boot 7 and separator leg 8, said legs 6 and 8 being arranged to deliver the elevated grain to weighing scales 9 of any ordinary or approved construction, from which the weighed grain discharges into a transfer hopper 10.

The hopper 10 is provided with a swivel spout 11 which may be adjusted to a position for delivering the grain to a temporary storage bin or receptacle 12, of which one or more may be used, when the grain is to be treated prior to delivery to the storage bins of the elevator, or which may be adjusted to a position for transferring the grain directly from the hopper 10 to a belt or conveyor 13 for direct delivery of the grain to the storage bins 14 of the elevator, one of which is shown.

The temporary storage bin or receptacle 12 may be of suitable capacity, and is designed for the reception of the grain to be treated for the extermination of weevil or other insect life therein. This bin or receptacle 12 is provided with a spout 15 for discharge of the grain therefrom by gravity into a hopper 16 at the top of the insect exterminator 17, in which the grain is treated. This exterminator, the construction of which is hereinafter described in detail, is provided with an outlet for the discharge of the treated grain to a swivel spout 18. This spout 18 is adjustable for feeding the treated grain either to a cleaner or separator 19, when it is necessary to clean the grain prior to delivery to the bins 14, or for delivering the grain directly from the exterminator to the boot 7 when it is desired to transfer the grain directly from the exterminator to the hopper 10 either for re-circulation through the exterminator or to the bins 14 without cleaning when cleaning is unnecessary. The cleaner 19 may be of any of the constructions in common use or suitable for the purpose, and, therefore, a detailed description of the same is unnecessary.

A spout or other suitable conductor 20 conducts the cleaned grain from the separator to the boot 7.

The exterminator 17 is of tube type and designed for the gravity flow therethrough of the grain to be treated. It comprises a suitable framework 21 which supports the hopper 16, spout 18 and the metallic outer tube or casing 22 of the exterminator with which connects a conductor 30. The casing 22 is supported in an inclined plane to provide a gravity chute, the upper inlet end of which communicates with the hopper 16 and the lower outlet or discharge end of which communicates with the spout 18 and is provided with a grain retaining and discharge gate or valve 23. In the casing 22 are spiders 24 and 25 supporting in spaced relation therein and in concentric relation thereto an electrode 26 forming with the casing, which serves as the outer electrode or electrode of opposing polarity to the said inner electrode 26, the emission gap terminals of a high frequency oscillation generator 27. The electrode 26, as shown, comprises a metallic tube 28, perforate or imperforate, encased in an outer covering or shield 29 of glass, porcelain or other like insulating material, through which a conductor lead 30' from the electrode tube projects. The electrodes 22 and 26 as thus arranged provide a flow channel and space charge field 31 communicating at its upper end with the casing inlet and at its lower end with the casing outlet, which channel or field is adapted to be filled by grain flowing downward thereinto from the hopper 16 and to reduce the solidly massed traveling stream of grain into an annular stream of relatively small cross section. This annular stream is retained in place for treatment by the closed valve 23 and after treatment may be discharged into the spout 18 by opening the valve 23. The valve 23 may be either hand operated or automatically operated, a hand operated valve being shown in the present instance, but, if desired, a valve automatically operated at proper timed periods may be provided as in my aforesaid application executed of even date herewith. The grain contained in the channel or field 31 is subjected for the proper time period to the action of the high frequency oscillations, which have a specific action on the weevil or other insects, their larvae or pupa, whereby all such insect life is destroyed. On the opening of the valve 23 at the end of this period the treated streams of grain will be discharged from the exterminator channel or field and such streams recommingled in the discharge spout, and new grain to be treated from the hopper will flow in to take its place. The treated grain discharged from the exterminator may be passed directly from the exterminator to the boot 7 for return to the hopper 10 and delivery to the bins 14 when its cleaning is not necessary, or the grain discharged from the exterminator may be passed through the separator for cleaning before delivery to the boot 7.

By changing the traveling solidly massed stream of grain into a stream of annular formation and comparatively small cross section the grain is disposed in the high frequency field and in such relation to the electrodes as to be most effectually penetrated a plurality of times by and acted upon to best advantage by the high frequency oscillations passing in all directions across the field, thus reducing power losses and ensuring destruction of all insect life in the grain. The purpose of providing the electrode with coverings or facings of glass or like insulating material is to prevent direct accidental contact of the material treated with the metallic electrodes and to increase the efficiency of operation, as the high frequency electric oscillations or radio waves will be more effective in exterminating insects in material when passed through glass than through the air. Also I have found that glass has a pronounced effect, because of its high heating reaction to high frequency oscillations of the character employed, in favoring and promoting the speed of development of internal lethal heat in the insects, and the rapidity of destruction of the insects, without injurious action on the grain or carrier material. This is due to the fact that the rise in temperature produced in the insects by the effects of the eddy currents is supplemented to a large extent by the radiant heat produced in the glass shields. In other words, the insects, when thus treated, are subjected to the dual action of being heated from within and without, thus bringing about a quick rise of temperature to the lethal point. During this treatment intervening grains of wheat are also exposed to the radiant heat from the glass, but the grain being a very poor heat conductor does not respond to temperature elevation as rapidly or to the same degree as the insects or to such a degree as to be heated to an injurious extent during the time period of treatment. The grain, therefore, will be kept comparatively cool while the insects succumb to treatment, because the insects develop a lethal temperature considerably above that developed in the carrier material. The foregoing action is quite analogous to that occurring with light waves and heat waves emanating from the sun. The light rays are invisible and likewise the heat waves are ineffective until they reach the relatively dense atmosphere of the earth. In the case of light waves, they must be reflected before they are visible. In the case of heat waves they are manifested on encountering our dense atmosphere. So it is with the high frequency electrical oscillation waves transmitted through the plate glass. This medium which is denser than the atmosphere absorbs much energy as the high frequency electrical or oscillation waves pass through it which is immediately reflected in a rise of temperature because the energy so absorbed has its exact equivalent in heat. It is quite possible that by the use of ordinary glass, certain wave lengths are completely absorbed, as in the case of ultra violet rays which pass through quartz but are absorbed by ordinary glass. Another advantage incident to the use of glass is that while absorbing rays to which it has heat reaction it permits light waves to pass through it with but little diminution, which appears to be of some importance in that, in addition to resonance and developed lethal heat, invisible light or other rays have some effect in causing rapid destruction of the insects, as well as some influence producing neutralization or amplification of the natural electrical potential with which the protoplasm is endowed and upon the maintenance of which life depends.

In the concentric electrode form of tube type generator herein shown, the grain is protected from injurious electrical charges by providing the inner electrode or electrodes with glass coverings or shields, which at the same time through their heat reaction effect promote the development of lethal heat in the insects. The use of a treater of this type is of advantage in enabling the grain to be disposed in a stream of circular or partly circular form of small cross-section, or of the grain being disposed between electrodes in such manner as to physically expose the same more favorably and effectively to the action of the high frequency electrical oscillations. Another advantage of the use of the concentric tube type of heater is that it produces a very intense and uniform electrostatic or electromagnetic field in which the infested material is treated. In carrying out the operation with this type of apparatus, a standing wave oscillator of the type shown or any equivalent type may be employed and the treator tube and oscillator may be in main respects of substantially the same construction, the oscillator being formed, like the treater, of an outer copper tube $B^1$ providing a linear conductor of about 6" in diameter which projects from and connects the plate electrodes or anodes $B^2$ of two three-element vacuum tubes, one located at each end of the oscillator, the oscillator having also like the treater an inner tube or linear conductor $B^3$ also made of copper and projecting from and connecting the grid elements $B^4$ located between the heated cathodes $B^5$ and the said anodes $B^2$ of the three-element vacuum tubes, the oscillator being operatively connected with the treater through output connections hereinafter described. By employing a tubular concentric treater and balancing the impedance or inductance of the transmission line against the capacitance of the two concentric tubes, and making these tubes of proper length, a most highly efficient way of employing the generator oscillation energy is obtained. It is of extreme importance that the length of the treater so made and its electrical capacitance be such that the standing wave oscillation put out by the generator will be most effectively used in the material under treatment. As the length of the concentric tubular treater so coupled to the oscillation generator combined with the inductance of the transmission line is a function of the wave length of the oscillator, power losses are prevented and a highly intense field obtained. Thus it will be seen that by the action of the apparatus the main solidly massed stream of grain will be converted into a stream of annular form and suitable cross-section to be treated and that such annular stream will lie in a space charge field in the path of the high frequency electromagnetic and/or electrostatic waves passing between the surfaces of the electrodes so that all insect life, regardless of state of growth or degree of resistivity to the effects of the high frequency oscillations, will be destroyed during the treatment period. The grain discharged from the exterminator and again restored to a solid mass stream will, therefore, be free from insect life and may be conducted from the exterminator to the storage bins of the elevator or grainery for storage therein with or without being passed through the cleaner, as occasion required. By the treatment of the grain at an initial period, or while it is being transferred from a delivery or carrier vehicle to the elevator the insect life therein may be destroyed at a time when a comparatively small amount exists, thus preventing the great increase of insect life and the resulting ravages on the grain which occurs after the grain is stored for a period in the storage bins, for reasons above given. In the travel of the grain from point to point or bin to bin in the elevator or grainery, it may also be treated, without any special movement of the grain being instituted for the purpose, so as to keep the grain either entirely free from insect life or free to such an extent as to prevent wholly or largely the losses commonly due to destruction of the grain by insect life. My invention also obviates the necessity of cooling and airing the grain for the purpose of controlling insect life multiplication, or materially reduces the number of cooling and airing steps required to keep the grain in good condition during a lengthy period, and the resulting losses in weight due to attrition of the grain as a result of contact with other surfaces and to the drying out of the grain in transit.

However, this insect destroying apparatus may be used in conjunction with the drier, such as a Hess drying system, for giving high frequency to the grain while it is being dried to relieve it from excess moisture, with this advantage under such conditions that the physical drying of the grain by the drying system will hasten and increase the efficiency of the high frequency action by coacting with the high frequency waves to raise the temperature of the grain and the insects, thereby more rapidly decreasing the resistance of the insects to the destructive action of the high frequency waves, while the high frequency waves, on the other hand, by raising the temperature of the grain hasten and promote the drying action, so that a very effective coaction between the two methods of treatment is obtained to simultaneously dry the grain and destroy the insects therein. I have discovered that heat reaction of the insects to the high frequency oscillations is favored and greatly promoted when moisture is present in the grain, and particularly in the use of an electrode casing or shield having high heat reaction to the high frequency oscillations. The effect of the high frequency oscillations, therefore, is to develop heat in the moisture as well as in the glass casing or electrode, by which the development of the lethal heat in the insects is effected with greater rapidity than in the treatment of dry grain. The development of lethal heat in the insects may be promoted with still greater rapidity by subjecting the grain to the drying action of physical heat while it is being subjected to the heat developing action of the high frequency oscillations, as the effect is to secure a more rapid transfer of the heat to the bodies of the insects because of their increased conductivity in the presence of moisture while at the same time the grain is being kept comparatively cool by evaporation of the moisture.

The drawings show in Fig. 6 a high frequency oscillation apparatus suitable for use with exterminators of the type herein disclosed, as well as of the type disclosed in my aforesaid application executed of even date herewith. In this high frequency oscillation apparatus the connections to the exterminator are shown at point A and a vacuum tube B is provided for producing the high frequency oscillations. Three phase 60 cycle 220 volt alternating current power enters at point C through suitable switch and fuses, from which it passes to contactor panel D which is equipped in practice with the usual overload relays, contactors, etc., which have been omitted for sake of clearness and as unessential to the disclosure. At E auto-transformers are placed for the purpose of varying the voltage applied to the plate transformers shown at F. These transformers step the voltage up where it is applied to the plates of the six rectifier tubes G. In these rectifier tubes G high potential unidirectional (direct) current is produced which flows through choke coil H to condenser K and to oscillator tube B. The filaments of rectifier tubes G are heated by means of current supplied from transformer L, while the filaments at each end of vacuum tube B are heated by current furnished from transformer M. In starting the apparatus the main switch at C is closed, after which push button N is closed, which automatically opens the air interlock P and water interlock Q controlling the supply of cooling air and water for oscillator tube B and the supply of water for rectifier tubes G. Finally, the closing of push button R places the apparatus in operation. The drawings show the usual voltmeters and ammeters for measuring the electric energy, as well as certain necessary ground connections, as indicated at X and Y. This type of oscillator has high capacity, approximately 20 kilowatts, and is built for high frequencies, in the order of fifty million or more per second, but any suitable type of high frequency oscillator for producing the desired high frequency or range of high frequencies may be used, and in practice provision is made for varying the frequency of the oscillators from, say, ten million to fifty million or more cycles per second, for supplying the proper frequency according to the electrical conductivity and other requirements of the material or substance and particular kind of insect under treatment.

As shown, the oscillator is provided at point A with three terminals A', A³ and A², the first two forming pole terminals connected with the conductor B³ at two points spaced apart on opposite sides of its transverse center, and the third a ground terminal connected with said conductor at its center. In the use of this high frequency apparatus in connection with an exterminator of tube type herein disclosed, wherein electrodes 22 and 26 of the character described are used, the electrodes 22 and 26 are respectively connected through the conductors 30 and 30' to terminals A² and A³, while in the use of this high frequency apparatus in connection with platen type electrodes, as disclosed in my said application filed of even date herewith, the sets of electrodes of opposite polarity are respectively connected to the terminals A' and A³. The terminals of the conductors 30 and 30' are, as shown, connected to the treatment electrodes at two points spaced apart in the length of the treater a predetermined distance on opposite sides of the transverse center of the treater so that when the frequency produced by the oscillation generator is impressed through the described conducting connections upon the treater a standing wave is set up in the tube 26 and a corresponding wave induced in the tube 22.

In the modified form of my invention disclosed in Figs. 7 to 11, inclusive, I have disclosed a modified construction of exterminator 17' comprising a casing 22' of metal, wood or other suitable material and which is preferably square in cross-section and arranged to provide a vertical chute. The upper end of this casing is formed by or communicates with an inlet hopper 16' and the lower end of the casing is provided with an outlet 18ᵃ having a grain retaining and discharge gate or valve 18'. The casing, if of metal, may be grounded, as shown. In the casing are sets of electrodes 32 and 33 which may consist of either rods or tubes of good conducting metal, but which are herein shown as tubes, each swage-closed at its lower end, as at 34, and each provided at its upper end with a screw 35 welded or sweated thereto. The screws 35 of the sets of electrodes 32 and 33 connect the respective sets of electrodes with bus bars 36 and 37 having terminals 36' and 37' for connection with the terminals A' and A³ of the high frequency apparatus shown in Fig. 6. Each electrode rod or tube is provided with a covering or sheathing 38 of glass, porcelain or other suitable insulating material for the purpose hereinbefore described, and the bus bars 36 and 37 are each provided with a similar sheathing 39. With the arrangement of electrodes shown in this embodiment of the invention, in which the electrodes form a grid or grill like structure providing a large number of working fields, and in which each electrode radiates energy in all directions laterally and forms the emission element of a plurality of fields, the grain is penetrated freely and uniformly by the radiant energy, with the result that all insect life therein is quickly destroyed.

The high frequency generator employed, as will be evident, is one adapted for producing short or ultra-short waves. By short waves are meant those of a band range between 10 meters (about 30,000 kilocycles or 30,000,000 cycles) to 30 meters (about 10,000 kilocycles or 10,000,000 cycles) or more, and by ultra-short waves are meant waves of a band between 10 meters and 6 meters (about 50,000 kilocycles or 50,000,000 cycles) and in some cases as low as 3 meters (about 100,000 kilocycles or 100,000,000 cycles). In general the wave length ranges of from 6 to 30 meters, or frequency ranges of from 50,000 kilocycles to 10,000 kilocycles, will be found sufficient, though frequencies within the maximum and minimum ranges given may be employed. I have found that in treating grain in a thin sheet with frequencies in the order of 55,000,000 and above all insect life will succumb within one to three seconds.

Extensive study and laboratory and practical working tests made by me show that by producing high frequency oscillations of the order of ten million to fifty million, or possibly in some cases one hundred million cycles per second, and exposing the infested material to be treated to such oscillations, an action will be produced through the effect of eddy currents being induced in the adult insects, eggs, larvae, or pupa sufficient to elevate the temperature of such insects and their progeny to the point where they will succumb to the induced heat. Where the electrical conductivity of the material treated is less than that of the insect to be destroyed the temperature induced in the treated part of the material will be lower than that induced in the insect. The effect of the induced eddy currents of the frequencies employed is to develop by induction in the insect, eggs, larvae or pupa, a temperature of from 110° to 150° F., the most effective temperatures being from 120° to 140° F., at which temperatures the insects, their eggs, larvae or pupa are destroyed without inducing such a high temperature in the grain, or a sufficiently high temperature to effect the germinating properties of the grain, which will remain unaffected for the short period to which it is exposed during treatment. My studies and investigations have also indicated that resonance also assists in elevating the temperature of the insect as well as the induced eddy currents; in other words, that insects in the different forms may be "tuned" to resonate with certain frequencies. This resonation undoubtedly tends to temperature elevation which is additive to the temperature elevation brought about by the induced eddy currents. The period of treatment for destroying insect life in grain varies to certain degrees dependent upon the electrical conductivity of the grain and insects and the frequency used, but ordinarily ranges from two or three seconds for very high frequencies, 50,000 kilocycles and above to one or two minutes for lower frequencies, i. e., 10,000 kilocycles, during which period of time all insect life is destroyed. This period is insufficient to cause an injury to the grain by the developed temperatures.

The apparatus embodying my invention, as herein set forth, may be employed for the treatment of infested grains or cereals in elevators, graineries, warehouses and other containers for the treatment of grain while the grain is being loaded or unloaded or transferred from point to point in the elevator or other storage place, and particularly in the transit of grain from a delivery vehicle to the elevator for storage, so that the grain may be treated at the time best adapted for the purpose as well as to enable the operation to be easily, quickly and conveniently carried out, without the necessity of re-handling the grain for the purpose. The apparatus may, of course, be either in the form of permanent or temporary installations at the elevators, graineries or other plants where it is to be used, it may be of portable type so as to be used in any portion of an elevator or storage plant, and the grain conveying systems of graineries, elevators or other like grain containers may be easily modified in construction to include the exterminator so that either fixed or portable generators may be used in connection therewith for carrying out the treatment. A great advantage of this apparatus and method of treatment, besides that of economy of operation, is that it is inexpensive in construction and may therefore be supplied and installed at a comparatively low cost, is rapid in its action, allowing a large amount of material to be treated within a given time, and under all proper conditions it has no deleterious effect whatever upon the grain treated, the character and time period of treatment being such as to avoid any appreciable drying out or other deleterious effect on the grain.

In practice I have found that in the treatment action the insects are destroyed by what seems to be the effect of heat and some specific action on the nervous system or vital organs of the insects by the electrical oscillations. These effects are produced by the peculiar character of the waves whatever they may be, electromagnetic and/or electrostatic, or of other character, generated by space discharge action in a high frequency field. It is to be understood, therefore, that by the use of the expression "subjecting the grain to the action of high frequency oscillations" in "a high frequency field" or equivalent expressions in the claims, I mean any treatment action whereby and wherein the infested grain is subjected to the action of produced high frequency actions destructive to insect life.

While the structural organization herein shown and set forth for carrying the invention into practical effect may be effectively employed, it is to be understood that the invention is susceptible of various changes or modifications without departing from the principle or sacrificing any of the advantages of the invention, and hence I reserve the right to vary the construction, relative arrangement and the operation of the parts to material degrees so long as the same fairly fall within the spirit and scope of the appended claims.

What I claim is:—

1. The method of dehumidifying and disinfecting grain which consists in subjecting the grain to the physical drying action of heat to evaporate the moisture therein, and simultaneously subjecting the grain to the action of high frequency electrical oscillations of a frequency rapidly destructive to insect life in the presence of moisture.

2. A high frequency electrical exterminator for destroying insect life in grain embodying electrodes formed and arranged to provide between them a grain channel and a high frequency electrical field gap of annular cross-section to receive the grain to be treated, and a generator of high frequency electrical oscillations associated with said electrodes for generating and subjecting the grain in the gap to the action of high frequency oscillations of lethal frequency.

3. In an apparatus for transporting grain and treating the same for extermination of insect life therein during its course of travel, a transporting system, and an insect exterminator in the line thereof having electrodes cooperatively arranged to define an annular high frequency electric field gap to receive the grain, and an oscillation valve generator including said electrodes for generating and passing high frequency electric oscillations of lethal frequency through said field.

4. In an apparatus for transporting grain and treating the same for extermination of insect life therein during its course of travel, a transporting system, and an insect exterminator in the line thereof comprising a casing forming an outer electrode and an inner electrode cooperatively arranged to define an annular high frequency electric field gap to receive the grain, and means for generating and passing high frequency electric oscillations through said field.

5. In an apparatus for transporting grain and treating the same for extermination of insect life therein during its line of travel, a transporting system, and an exterminator arranged in the line thereof and comprising a casing forming an outer electrode, a plurality of inner electrodes in said casing cooperatively arranged to form therewith an annular high frequency electric field gap, and an oscillation valve generator including said electrodes for generating high frequency oscillations destructive to insect life and passing such oscillations through said field gap.

6. In an apparatus for transporting and treating grain, means for conducting a stream of grain to be transferred from one point to another, an exterminator in the line of feed embodying an outer cylindrical electrode and an inner electrode coacting therewith to form a high frequency electric field gap and operative as guiding surfaces to dispose the grain in said gap, and a vacuum tube generator including said electrodes for generating and subjecting the grain disposed in such field gap to the action of high frequency oscillations of a high frequency destructive to insect life.

7. In an apparatus for transporting and treating grain, means for conducting a stream of grain to be transferred from one point to another, an exterminator in the line of feed embodying an outer cylindrical electrode and a plurality of spaced circular inner electrodes coacting therewith to form an annular flow passage and high frequency electric field gap, and a vacuum tube high frequency oscillation generator including said electrodes for generating and passing high frequency electric oscillations of destructive frequency through said field.

8. In an apparatus for transporting and treating grain, means for conducting a stream of grain to be transferred from one point to another, an exterminator in the line of feed presenting curved electrodes defining a grain receiving channel and a high frequency electric field gap, and an ultra-short wave generator associated with said electrodes for generating and subjecting the grain in the field gap to the action of ultra-short waves of destructive frequency.

9. In an apparatus for transporting and treating grain, means for conducting a stream of grain to be transferred from one point to another, an exterminator in the line of feed presenting circular electrodes defining a grain receiving channel and a high frequency electric field gap, and an ultra-short wave generator associated with said electrodes for generating and subjecting the grain in the field gap to the action of ultra-short waves of destructive frequency.

10. A high frequency electrical exterminator for destroying insect life in grain comprising a casing, curved electrodes in said casing forming a correspondingly shaped channel and high frequency electric field gap, and a generator of high frequency electrical oscillations connected to said electrodes.

11. A high frequency electrical exterminator for destroying insect life in grain comprising coaxially arranged, circular electrodes forming a correspondingly shaped high frequency electric field gap, to receive the material to be treated and a generator of high frequency electrical oscillations connected with said electrodes.

12. An exterminator of the character set forth in claim 10 wherein each electrode comprises a metallic conductor having a facing of electric non-conducting material.

13. A high frequency electrical insect exterminator comprising a casing, cross sectionally circular electrodes arranged in working groups in the casing so as to provide rows of electrodes arranged in planes at right angles to each other and in which opposed electrodes of adjacent rows form grain receiving spaces and high frequency electric fields, and a high frequency generator connected to said groups of electrodes.

14. A high frequency electrical insect exterminator comprising a casing, electrodes of cross-sectionally circular form arranged in rows in said casing, conductors connecting the electrodes in working groups of opposite polarity, and a high frequency generator connected to said conductors.

15. In a high frequency electrical exterminator for destroying insect life in grain, means for subjecting grain to the physical drying action of heat to evaporate the moisture therein, and means for simultaneously subjecting the grain to the action of high frequency electrical oscillations of a frequency rapidly destructive to insect life in the presence of moisture.

16. An apparatus for treating grain or other products for the purpose of destroying insect life therein, comprising a receptacle forming one terminal of a high frequency oscillation circuit, a plurality of spaced electrode elements therein forming the other terminal of the high frequency oscillation circuit and arranged to form with each other and with the casing a plurality of high frequency field spaces, and means for generating in said circuit high frequency oscillations destructive to insect life and passing the same through the grain disposed in said field spaces.

17. In an apparatus for treating grain for the destruction of insect life therein, an exterminator presenting curved electrodes defining a grain receiving channel and a high frequency electric field gap, and a short wave generator associated with said electrodes for generating and subjecting the grain in the gap to the action of short waves of destructive frequency.

18. In an apparatus for treating grain for the destruction of insect life therein, an exterminator presenting electrodes defining an annular grain receiving channel and high frequency field gap, and a short wave generator associated with said electrodes for generating and subjecting the grain in the field gap to the action of short waves of destructive frequency.

19. Apparatus for treating a product to destroy impurities comprising coaxial cylinders, means for projecting into the region between said cylinders said product to be treated, and means for impressing on said cylinders a high frequency electro-motive force thereby to impress in the region between said cylinders a high-frequency electro-magnetic field.

20. In an apparatus for destroying insects in insect infested material, a high frequency oscillation generator, an exterminator formed of inner and outer curved concentrically arranged electrodes defining a high frequency field space to receive the material to be treated, and an output connection between the generator and exterminator.

21. In an apparatus for destroying insects in insect infested material, a high frequency oscillation generator, an exterminator formed of an outer cylindrical metal electrode and an inner electrode, said electrodes being concentrically arranged and defining an annular high frequency field space to receive the material to be treated, and an output connection between the generator and exterminator.

22. In an apparatus for destroying insects in insect infested material, a high frequency oscillation generator, an exterminator formed of an outer cylindrical metal electrode and an inner glass coated metal electrode, said electrodes being concentrically arranged and defining an annular high frequency field space to receive the material to be treated, and an output connection between the generator and exterminator.

23. In an apparatus for destroying insects in insect infested material, a standing wave high frequency oscillation generator, an exterminator embodying spaced electrodes defining a high frequency field space to receive the material to be treated, and output leads extending from two points spaced apart on the generator to the respective electrodes of the exterminator.

24. In an apparatus for destroying insects in insect infested material, a high frequency oscillation generator, an exterminator formed of inner and outer curved concentrically arranged glass shielded concentric electrodes defining a field space to receive the material to be treated, and an output connection between the generator and the exterminator.

25. In an apparatus for destroying insects in insect infested material, a high frequency oscillation generator, an exterminator formed of an inner cylindrical glass coated metal electrode and an outer cylindrical glass coated electrode concentrically arranged and defining an annular high frequency field space to receive the material to be treated, and an output connection between the generator and the inner electrode of the exterminator.

26. In an apparatus for treating grain for the destruction of insect life therein, an exterminator presenting electrodes defining an annular grain receiving channel and high frequency field gap, and a standing wave oscillation generator associated with said electrodes for generating and subjecting the grain in the gap to the action of high frequency oscillations of destructive frequency.

27. A high frequency apparatus for treating grain comprising a pair of treating electrodes having a space therebetween adapted to receive grain for treatment, a standing wave electrical oscillation generator comprising cathode, anode and grid electrodes, and emission connections from two points spaced apart on said generator to two points spaced apart on said treating electrodes.

28. A high frequency apparatus for treating grain comprising a pair of treating electrodes having a space therebetween adapted to receive grain for treatment, a standing wave electrical oscillation generator comprising cathode, anode and grid electrodes, and electrical connections from two points spaced apart on said grid electrode to two points spaced apart on said treating electrodes.

29. A high frequency apparatus for treating grain comprising a pair of treating electrodes having a space therebetween adapted to receive grain for treatment, a standing wave electrical oscillation generator comprising cathode, anode and grid electrodes, emission connections from two points spaced apart on said generator to two points spaced apart on said treating electrodes, and a dielectric interposed to insulate said grain from at least one terminal of said oscillation generator.

30. A high frequency apparatus for treating grain comprising a pair of treating electrodes having a space therebetween adapted to receive grain for treatment, a standing wave oscillation generator comprising cathode, anode and grid electrodes, emission connections from two points spaced apart on said generator to two points spaced apart on said treating electrodes, and dielectrics interposed to insulate the grain from both terminals of said oscillation generator.

31. In an apparatus for treating grain, a pair of treating electrodes spaced apart to form a chamber adapted to receive grain, an electrical oscillator comprising a pair of cathodes, a pair of concentric tubular members, a grid electrode for each said cathode and attached to an end of said inner tubular member, an anode for each cathode connected to an end of said outer tubular member, and a pair of leads connected respectively to two points spaced apart on one of said tubular members and arranged to produce an electric field in the space between said treating electrodes.

32. In an apparatus for electrical treatment of grains and the like, means for disposing grain between electrode surfaces adapted to have standing electrical waves induced upon them, and means for generating electrical oscillations of such frequency as will produce standing electrical waves on said electrodes.

33. In an apparatus for electrical treatment of grains and the like, means for disposing grain between electrode surfaces adapted to have standing electrical waves induced upon them, and means for generating electrical oscillations of such frequency as to cause said electrodes to vibrate electrically at their natural period of vibration.

34. In combination, a generator of electrical oscillations in a receptacle for grain or the like, including an electrical conductor adapted to set up an electric field traversing said grain, and having a natural period of electrical vibration proportioned to correspond with the frequency of the oscillations produced by said generator to subject said grain to standing wave oscillations most effective in exterminating life in the grain under treatment.

35. An apparatus for treatment of grain comprising a pair of concentric cylindrical conductors, one supporting a grid electrode at each end and the other supporting a plate electrode at each end, an electron emissive cathode associated with each grid, said cathodes, grids, anodes and connecting tubular conductors constituting a standing wave oscillator, spaced treatment electrodes, and connections from said oscillator adapted to induce standing waves between said treatment electrodes.

36. In combination, a standing wave vacuum tube generator of high frequency oscillations, a treatment device embodying a pair of parallel conductors forming between them a field space for reception of the material treated, means for admitting grain to and discharging the grain from the field space, and an output connection between the standing wave generator and treatment device for impressing the generated high frequency oscillations on said conductors.

37. In an apparatus for destroying insects in insect infested material, a high frequency oscillation generator, an exterminator formed of an inner cylindrical metal electrode and an outer cylindrical electrode concentrically arranged and defining an annular high frequency field space to receive the material to be treated, and an output connection between the generator and the exterminator.

38. In combination with a receptacle for electrical treatment of grain or the like, an electrical conductor adapted to set up an electric field traversing said receptacle, and a standing wave generator of electrical oscillations connected to supply electrical energy to said conductor.

39. An apparatus for electrical treatment of grain or the like comprising a grain receptacle embodying electrode elements adapted to be caused to vibrate electrically to produce standing electrical waves traversing said receptacle, and a standing wave electrical oscillator for supplying electrical energy to said elements.

40. An apparatus for treating grain or other products for the destruction of insect life therein, comprising curved electrodes forming a correspondingly shaped high frequency field gap to receive the grain to be treated, and an ultra-short wave generator for generating ultra-short waves of lethal frequency and impressing the same upon said electrodes.

JESSE H. DAVIS.